US009910465B2

(12) United States Patent
Tazbaz et al.

(10) Patent No.: US 9,910,465 B2
(45) Date of Patent: Mar. 6, 2018

(54) COVERED RADIUS HINGE

(71) Applicant: Microsoft Technology Licensing, LLC, Redmond, WA (US)

(72) Inventors: Errol Mark Tazbaz, Bellevue, WA (US); Karsten Aagaard, Monroe, WA (US); Eric Witt, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/538,775

(22) Filed: Nov. 11, 2014

(65) Prior Publication Data
US 2016/0132075 A1 May 12, 2016

(51) Int. Cl.
*G06F 1/16* (2006.01)
*H04M 1/02* (2006.01)

(52) U.S. Cl.
CPC .......... *G06F 1/1681* (2013.01); *G06F 1/1616* (2013.01); *G06F 1/1618* (2013.01); *H04M 1/022* (2013.01); *H04M 1/0216* (2013.01)

(58) Field of Classification Search
CPC .... G06F 1/1681; G06F 1/1618; G06F 1/1616; G06F 1/1652; E05D 3/06; E05D 3/10; H04M 1/022; H04M 1/0216
USPC ............... 361/679.04–679.17, 679.21–679.3, 361/679.55–679.57, 679.01, 679.02; 16/354, 366, 368, 369, 370, 254, 270, 16/271, 272, 365, 382, 384, 387
See application file for complete search history.

(56) References Cited

U.S. PATENT DOCUMENTS

| 4,355,666 A | 10/1982 | Torii |
| 4,611,710 A | 9/1986 | Mitsufuji |
| 4,711,046 A | 12/1987 | Herrgord |
| 5,056,192 A | 10/1991 | Grass |
| 5,229,921 A | 7/1993 | Bohmer |
| 5,456,195 A | 10/1995 | Ozaku et al. |
| 5,509,590 A | 4/1996 | Medeiros, Jr. |
| 5,796,575 A | 8/1998 | Podwalny et al. |
| 5,845,366 A | 12/1998 | Kuroda |
| 5,987,704 A | 11/1999 | Tang |

(Continued)

FOREIGN PATENT DOCUMENTS

| CN | 203669484 U | 6/2014 |
| CN | 204553530 U | 8/2015 |

(Continued)

OTHER PUBLICATIONS

"Laptop Back Covers Shell for Dell 15R 5520 7520 M521R 5525 PN T87MC Laptop Hinge Cover", Retrieved on: Sep. 4, 2014; Available at: <<http://www.alibaba.com/product-detail/Laptop-back-covers-shell-For-Dell_1628979107.html>>.

(Continued)

*Primary Examiner* — Steven T Sawyer
*Assistant Examiner* — Sagar Shrestha
(74) *Attorney, Agent, or Firm* — Rainer Patents, P.S.

(57) ABSTRACT

The description relates to devices, such as computing devices that have hinged portions. One example can include a first portion and a second portion. This example can also include a multi-pivot hinge unit rotatably securing the first and second portions. This example can further include a set of rigid hinge cover portions that are configured to be able to rotate relative to one another while collectively covering the multi-pivot hinge unit.

19 Claims, 10 Drawing Sheets

(56) References Cited

U.S. PATENT DOCUMENTS

| | | | |
|---|---|---|---|
| 6,223,393 B1* | 5/2001 | Knopf | G06F 1/1681 16/366 |
| 6,421,235 B2 | 7/2002 | Ditzik | |
| 6,470,532 B2 | 10/2002 | Rude | |
| 6,505,382 B1 | 1/2003 | Lam et al. | |
| 6,527,036 B1 | 3/2003 | Welsh | |
| 6,754,081 B2 | 6/2004 | Rude et al. | |
| 6,757,160 B2 | 6/2004 | Moore et al. | |
| 6,831,229 B1 | 12/2004 | Maatta et al. | |
| 6,952,861 B2 | 10/2005 | Ynosencio | |
| 6,966,435 B2 | 11/2005 | Weiser et al. | |
| 7,140,074 B2 | 11/2006 | Han et al. | |
| 7,227,741 B2 | 6/2007 | Garel et al. | |
| 7,251,129 B2 | 7/2007 | Lee et al. | |
| 7,293,380 B2 | 11/2007 | Repecki | |
| 7,418,766 B2 | 9/2008 | Nelson et al. | |
| 7,520,025 B2 | 4/2009 | Hung | |
| 7,584,524 B2 | 9/2009 | Hung | |
| 7,636,985 B2 | 12/2009 | Greenbank | |
| 8,024,843 B2 | 9/2011 | Endo et al. | |
| 8,122,970 B2 | 2/2012 | Palen | |
| 8,441,791 B2 | 5/2013 | Bohn et al. | |
| 8,467,838 B2 | 6/2013 | Griffin et al. | |
| 8,590,857 B2 | 11/2013 | Chen et al. | |
| 8,624,844 B2 | 1/2014 | Behar et al. | |
| 8,649,166 B2 | 2/2014 | Wu | |
| 8,687,359 B2 | 4/2014 | Theobald et al. | |
| 8,713,759 B2 | 5/2014 | Cai | |
| 8,743,538 B2 | 6/2014 | Ashcraft et al. | |
| 8,796,524 B1 | 8/2014 | Deck | |
| 8,797,727 B2 | 8/2014 | Ashcraft et al. | |
| 8,804,324 B2 | 8/2014 | Bohn et al. | |
| 8,843,183 B2 | 9/2014 | Griffin et al. | |
| 8,854,834 B2 | 10/2014 | O'Connor et al. | |
| 9,047,055 B2 | 6/2015 | Song | |
| 9,243,432 B2* | 1/2016 | Lee | E05D 3/06 |
| 9,411,365 B1 | 8/2016 | Tanner et al. | |
| 9,625,947 B2 | 4/2017 | Lee et al. | |
| 9,625,953 B2 | 4/2017 | Bitz et al. | |
| 9,625,954 B2 | 4/2017 | Campbell et al. | |
| 2004/0091101 A1 | 5/2004 | Park et al. | |
| 2005/0122671 A1 | 6/2005 | Homer | |
| 2006/0079277 A1 | 4/2006 | Ditzik | |
| 2007/0039132 A1 | 2/2007 | Jung et al. | |
| 2007/0049376 A1 | 3/2007 | Cho et al. | |
| 2007/0107163 A1 | 5/2007 | Barnett | |
| 2007/0117600 A1* | 5/2007 | Robertson | H04M 1/0216 455/575.3 |
| 2007/0247799 A1 | 10/2007 | Nie et al. | |
| 2008/0174089 A1 | 7/2008 | Ekberg | |
| 2009/0147458 A1 | 6/2009 | Wang et al. | |
| 2010/0154171 A1 | 6/2010 | Lombardi et al. | |
| 2010/0232100 A1* | 9/2010 | Fukuma | F16G 13/18 361/679.01 |
| 2011/0000136 A1 | 1/2011 | Brun | |
| 2011/0177850 A1 | 7/2011 | Griffin et al. | |
| 2011/0292605 A1 | 12/2011 | Chen | |
| 2012/0147542 A1 | 6/2012 | Kim | |
| 2012/0272481 A1 | 11/2012 | Ahn et al. | |
| 2012/0279014 A1 | 11/2012 | Carlsson | |
| 2013/0014346 A1 | 1/2013 | Ahn et al. | |
| 2013/0081229 A1 | 4/2013 | Hirano | |
| 2013/0135809 A1 | 5/2013 | Uchiyama et al. | |
| 2013/0139355 A1 | 6/2013 | Lee et al. | |
| 2013/0152342 A1 | 6/2013 | Ahn | |
| 2013/0216740 A1* | 8/2013 | Russell-Clarke | B23K 26/38 428/33 |
| 2013/0219663 A1 | 8/2013 | Cai | |
| 2014/0084772 A1 | 3/2014 | Zhang et al. | |
| 2014/0111954 A1 | 4/2014 | Lee et al. | |
| 2014/0160055 A1 | 6/2014 | Margolis et al. | |
| 2014/0174227 A1* | 6/2014 | Hsu | E05D 3/14 74/98 |
| 2014/0196253 A1* | 7/2014 | Song | G06F 1/1601 16/225 |
| 2014/0196254 A1 | 7/2014 | Song | |
| 2014/0217875 A1* | 8/2014 | Park | H05K 5/0226 312/326 |
| 2014/0226275 A1 | 8/2014 | Ko et al. | |
| 2014/0239065 A1 | 8/2014 | Zhou et al. | |
| 2014/0245569 A1* | 9/2014 | Cho | E05D 3/122 16/370 |
| 2014/0352757 A1 | 12/2014 | Ramirez | |
| 2015/0092331 A1 | 4/2015 | Kinoshita et al. | |
| 2015/0138103 A1 | 5/2015 | Nishi | |
| 2015/0138712 A1 | 5/2015 | Solland | |
| 2015/0176317 A1 | 6/2015 | Lee | |
| 2015/0277506 A1* | 10/2015 | Cheah | G06F 1/1681 361/679.27 |
| 2015/0361696 A1 | 12/2015 | Tazbaz | |
| 2015/0362956 A1 | 12/2015 | Tazbaz | |
| 2015/0370287 A1 | 12/2015 | Ko et al. | |
| 2016/0132076 A1 | 5/2016 | Bitz et al. | |
| 2016/0139639 A1* | 5/2016 | Dash | G06F 1/26 714/773 |
| 2016/0147267 A1 | 5/2016 | Campbell et al. | |
| 2016/0187935 A1 | 6/2016 | Tazbaz et al. | |
| 2016/0215541 A1 | 7/2016 | Tazbaz et al. | |
| 2016/0357226 A1 | 12/2016 | Campbell et al. | |
| 2017/0090523 A1 | 3/2017 | Tazbaz et al. | |

FOREIGN PATENT DOCUMENTS

| | | |
|---|---|---|
| EP | 0844357 A1 | 5/1998 |
| EP | 1340879 A2 | 9/2003 |
| EP | 1464784 A1 | 10/2004 |
| EP | 2765478 A2 | 8/2014 |
| EP | 2765479 A2 | 8/2014 |
| KR | 20140049911 A | 4/2014 |
| WO | 2016/077254 A1 | 5/2016 |

OTHER PUBLICATIONS

Non-Final Office Action dated Mar. 29, 2016 from U.S. Appl. No. 14/588,138, 34 pages.

International Search Report and Written Opinion dated Feb. 22, 2016 from PCT Patent Application No. PCT/US2015/064173, 13 pages.

Response filed Mar. 3, 2016 to the Non-Final Office Action dated Dec. 10, 2015 from U.S. Appl. No. 14/606,979, 16 pages.

Non-Final Office Action dated Mar. 31, 2016 from U.S. Appl. No. 14/538,786, 16 pages.

Response filed Aug. 26, 2016 to the Final Office Action dated Jun. 1, 2016 from U.S. Appl. No. 14/606,979, 15 pages.

Applicant-Initiated Interview Summary mailed Aug. 29, 2016 from U.S. Appl. No. 14/606,979, 3 pages.

"Bi-Fold Hinges", Published on: May 9, 2012, Retrieved at: <<http://catalog.monroehinge.com/category/bi-fold-hinges>>, 1 page.

"Finger Protecta", Jul. 3, 2011, retrieved from <<http://shop.stormflame.com/finger-protecta-142-p.asp>> on Sep. 9, 2014, 2 pages.

"Fingersafe", May 26, 2013, retrieved from <<http://fingersafe.com/>> on Sep. 9, 2014, 2 pages.

"Moving Point Hinge-Multipivot Hinge", Retrieved on: Oct. 9, 2014, Available at: <<http://websystem.gismo.se/Gismo/files/1029/2.mph%2001%20introduktion.pdf>>, 6 pages.

"Multi-function stainless steel hydraulic shower door pivot hinge", retrieved on Sep. 10, 2015, at <<http://www.alibaba.com/product-detail/Multi-function-stainless-steel-hydraulic-shower_60153561047.html>> 10 pages.

"Plastic Slatband Chains", retrieved on Sep. 10, 2015, at <<http://www.irp.co.za/wp-content/assets/LFC002-7.5-Straight-Running-Double-Hinge-Chain.pdf>>, 1 page.

"Polyprop Boxes Accessories", Jun. 28, 2013 retrieved from <<http://www.presentingbinders.co.uk/Polyprop_Boxes_Accessories.html>> on Sep. 10, 2014, 6 pages.

(56) References Cited

OTHER PUBLICATIONS

"Samet SoftCover hinge wins the Innovation Award 2013", Feb. 8, 2013, retrieved from <<http://www.kozsusanidesign.com/samet-softcover-hinge-wins-the-innovation-award-2013/>> on Sep. 9, 2014, 2 pages.
"Single and double hinge type LBP (820 & 821 LBP)" retrieved on Sep. 10, 2015, at <<http://www.papadopoulos-bros.gr/en/proionta/erpystries-metaforikes-tainies/erpystries/plastikes/eutheias/monou-kai-diplou-mentese-typou-lbp-820-821-lbp/>>, 1 page.
Straight Running Chains, published Jul. 15, 2013, retrieved at <<http://www.ultraplastindia.com/stainless-steel-slat-chains.html>>, 2 pages.
"System Plast LF 820 K400 Acetal Straight Running Chain, 4 Width, 120" Length, Single Hinge", retrieved on Sep. 10, 2015, at <<http://www.amazon.com/System-Plast-Acetal-Straight-Running/dp/B00MJXUDIA>>, 3 pages.
Elliott, Amy-Mae, "9 Nifty Laptop Feet to Keep Your PC Running Cool", published on Jul. 30, 2012, retrieved at <<http://mashable.com/2012/07/30/laptop-feet/>>, 26 pages.
International Search Report dated Jan. 4, 2016 from PCT Patent Application No. PCT/US2015/059798, 13 pages.
Non-Final Office Action dated Dec. 10, 2015 from U.S. Appl. No. 14/606,979, 20 pages.
International Search Report dated Jan. 25, 2016 from PCT Patent Application No. PCT/US2015/060959, 11 pages.
International Search Report dated Jan. 4, 2016 from PCT Patent Application No. PCT/US2015/059799, 13 pages.
Notice of Allowance dated Jul. 14, 2016 from U.S. Appl. No. 14/555,184, 15 pages.
Final Office Action dated Jul. 29, 2016 from U.S. Appl. No. 14/588,138, 31 pages.
Corrected Notice of Allowability dated Aug. 4, 2016 from U.S. Appl. No. 14/555,184, 16 pages.
Response filed Jun. 29, 2016 to the Non-Final Office Action dated Mar. 29, 2016 from U.S. Appl. No. 14/588,138, 10 pages.
Response and Demand filed Jun. 15, 2016 from PCT Patent Application No. PCT/US2015/064173, 13 pages.
Response filed Jun. 29, 2016 to the Non-Final Office Action dated Apr. 12, 2016 from U.S. Appl. No. 14/555,184, 10 pages.
Response filed Jun. 30, 2016 to the Non-Final Office Action dated Mar. 31, 2016 from U.S. Appl. No. 14/538,786, 12 pages.
International Search Report and Written Opinion dated Apr. 12, 2016 from PCT Patent Application No. PCT/US2016/013815, 19 pages.
Non-Final Office Action dated Apr. 12, 2016 from U.S. Appl. No. 14/555,184, 32 pages.
Article 34 Demand mailed May 4, 2016 from PCT Patent Application No. PCT/US2015/059798, 17 pages.
Final Office Action dated Jun. 1, 2016 from U.S. Appl. No. 14/606,979, 48 pages.
Article 34 Demand mailed Jun. 8, 2016 from PCT Patent Application No. PCT/US2015/060959, 14 pages.
Response filed Oct. 31, 2016 to the Final Office Action dated Jul. 29, 2016 from U.S. Appl. No. 14/588,138, 10 pages.
Notice of Allowability dated Oct. 24, 2016 from U.S. Appl. No. 14/555,184, 11 pages.
Corrected Notice of Allowability dated Oct. 31, 2016 from U.S. Appl. No. 14/555,184, 6 pages.
Second Written Opinion dated Oct. 31, 2016 from PCT Patent Application No. PCT/US2015/059799, 8 pages.
Response filed Nov. 28, 2016 to the Written Opinion dated Apr. 12, 2016 from PCT Patent Application No. PCT/US2016/013815, 10 pages.
Corrected Notice of Allowability dated Nov. 21, 2016 from U.S. Appl. No. 14/555,184, 6 pages.
Response filed Dec. 8, 2016 to the Second Written Opinion dated Oct. 31, 2016 from PCT Patent Application No. PCT/US2015/059799, 12 pages.
International Search Report and Written Opinion dated Nov. 14, 2016 from PCT Patent Application No. PCT/US2016/048898, 16 pages.
International Preliminary Report on Patentability dated Nov. 29, 2016 from PCT Patent Application No. PCT/US2015/064173, 6 pages.
Response filed Dec. 7, 2016 to the Second Written Opinion dated Oct. 10, 2016 from PCT Patent Application No. PCT/US2015/060959, 8 pages.
Response filed Dec. 13, 2016 to the Non-Final Office Action dated Sep. 22, 2016 from U.S. Appl. No. 14/606,979, 22 pages.
Supplemental Response filed Dec. 8, 2016 to the Response filed Jun. 30, 2016 from U.S. Appl. No. 14/538,786, 8 pages.
Corrected Notice of Allowability dated Dec. 14, 2016 from U.S. Appl. No. 14/555,184, 6 pages.
Amended claims filed Dec. 22, 2016 from PCT Patent Application No. PCT/US2015/059798, 6 pages.
Notice of Allowance dated Dec. 27, 2016 from U.S. Appl. No. 14/538,786, 54 pages.
Non-Final Office Action dated Jan. 6, 2017 from U.S. Appl. No. 14/866,697, 72 pages.
Second Written Opinion dated Jan. 2, 2017 from PCT Patent Application No. PCT/US2016/013815, 6 pages.
Non-Final Office Action and Examiner Initiated Interview Summary dated Sep. 22, 2016 from U.S. Appl. No. 14/606,979, 27 pages.
Preliminary Amendment filed Sep. 26, 2016 from U.S. Appl. No. 15/239,417, 7 pages.
Response and Demand filed Apr. 6, 2016 from PCT Patent Application No. PCT/US2015/059799, 20 pages.
Interview Summary filed Oct. 11, 2016 from U.S. Appl. No. 14/606,979, 2 pages.
Second Written Opinion dated Oct. 10, 2016 from PCT Patent Application No. PCT/US2015/060959, 7 pages.
Notice of Allowance dated May 18, 2017 from U.S. Appl. No. 14/588,138, 41 pages.
International Preliminary Report on Patentability dated Apr. 4, 2017 from PCT Patent Application No. PCT/US2016/013815, 9 pages.
Non-Final Office Action dated May 25, 2017 from U.S. Appl. No. 15/239,417, 71 pages.
Corrected Notice of Allowability dated Jan. 13, 2017 from U.S. Appl. No. 14/538,786, 26 pages.
Non-Final Office Action dated Jan. 20, 2017 from U.S. Appl. No. 14/588,138, 12 pages.
Notice of Allowance dated Feb. 3, 2017 from U.S. Appl. No. 14/555,184, 18 pages.
International Preliminary Report on Patentability dated Jan. 24, 2017 from PCT Patent Application No. PCT/US2015/059799, 8 pages.
International Preliminary Report on Patentability dated Jan. 30, 2017 from PCT Patent Application No. PCT/US2015/059798, 6 pages.
Corrected Notice of Allowability dated Jan. 25, 2017 from U.S. Appl. No. 14/538,786, 6 pages.
Final Office Action and Examiner-Initiated Interview Summary dated Mar. 15, 2017 from U.S. Appl. No. 14/606,979, 56 pages.
International Preliminary Report on Patentability dated Mar. 3, 2017 from PCT Patent Application No. PCT/US2015/060959, 7 pages.
Corrected Notice of Allowability dated Mar. 16, 2017 from U.S. Appl. No. 14/555,184, 8 pages.
Response filed Apr. 10, 2017 to the Non-Final Office Action dated Jan. 20, 2017 from U.S. Appl. No. 14/588,138, 8 pages.
Corrected Notice of Allowability dated Mar. 21, 2017 from U.S. Appl. No. 14/538,786, 10 pages.
Response filed Mar. 29, 2017 to the Non-Final Office Action dated Jan. 6, 2017 from U.S. Appl. No. 14/866,697, 10 pages.
"Laptop Back Covers Shell for Dell 15R 5520 7520 M521R 5525 PN T87MC Laptop Hinge Cover", Retrieved on: Sep. 4, 2014; Available at: <<http://www.alibaba.com/product-detail/Laptop-back-covers-shell-For-Dell_1628979107.html>>.
Communication pursuant to Rules 161(1) and 162 EPC dated Jun. 21, 2017 from European Patent Application No. 5797752.1, 2 pages.

(56) References Cited

OTHER PUBLICATIONS

Response filed Jul. 20, 2017 to the Communication pursuant to Rules 161(1) and 162 EPC dated Jun. 21, 2017 from European Patent Application No. 15797752.1, 6 pages.
Supplemental Notice of Allowability dated Jul. 10, 2017 from U.S. Appl. No. 14/588,138, 6 pages.
Applicant Initiated Interview Summary dated Sep. 18, 2017 from U.S. Appl. No. 14/866,697, 3 pages.
Response filed Aug. 15, 2017 to the Final Office Action dated Mar. 15, 2017 from U.S. Appl. No. 14/606,979, 12 pages.
Applicant-Initiated Interview Summary dated Aug. 15, 2017 from U.S. Appl. No. 15/239,417, 9 pages.
Response filed Aug. 23, 2017 to the Non-Final Office Action dated May 25, 2017 from U.S. Appl. No. 15/239,417, 71 pages.
Communication pursuant to Rules 161(1) and 162 EPC dated Jul. 4, 2017 from European Patent Application No. 15801625.3, 2 pages.
Communication pursuant to Rules 161(1) and 162 EPC dated Jun. 21, 2017 from European Patent Application No. 15797753.9, 2 pages.
Notice of Allowance dated Sep. 26, 2017 from U.S. Appl. No. 14/866,697, 13 pages.
Final Office Action dated Jul. 19, 2017 from U.S. Appl. No. 14/866,697, 56 pages.
Demand filed Jun. 7, 2017 with Response to the International Search Report and Written Opinion from PCT Patent Application No. PCT/US2016/048898, 14 pages.
Second Written Opinion dated Aug. 1, 2017 from PCT Patent Application No. PCT/US2016/048898, 9 pages.
Communication pursuant to Rules 161(1) and 162 EPC dated Aug. 8, 2017 from European Patent Application No. 15816331.1, 2 pages.
Notice of Allowance dated Sep. 1, 2017 from U.S. Appl. No. 14/588,138, 16 pages.
Notice of Allowance dated Sep. 12, 2017 from U.S. Appl. No. 15/239,417, 20 pages.
Corrected Notice of Allowability dated Sep. 26, 2017 from U.S. Appl. No. 15/239,417, 12 pages.
Response filed Sep. 13, 2017 to the Final Office Action dated Jul. 19, 2017 from U.S. Appl. No. 14/866,697, 11 pages.

* cited by examiner

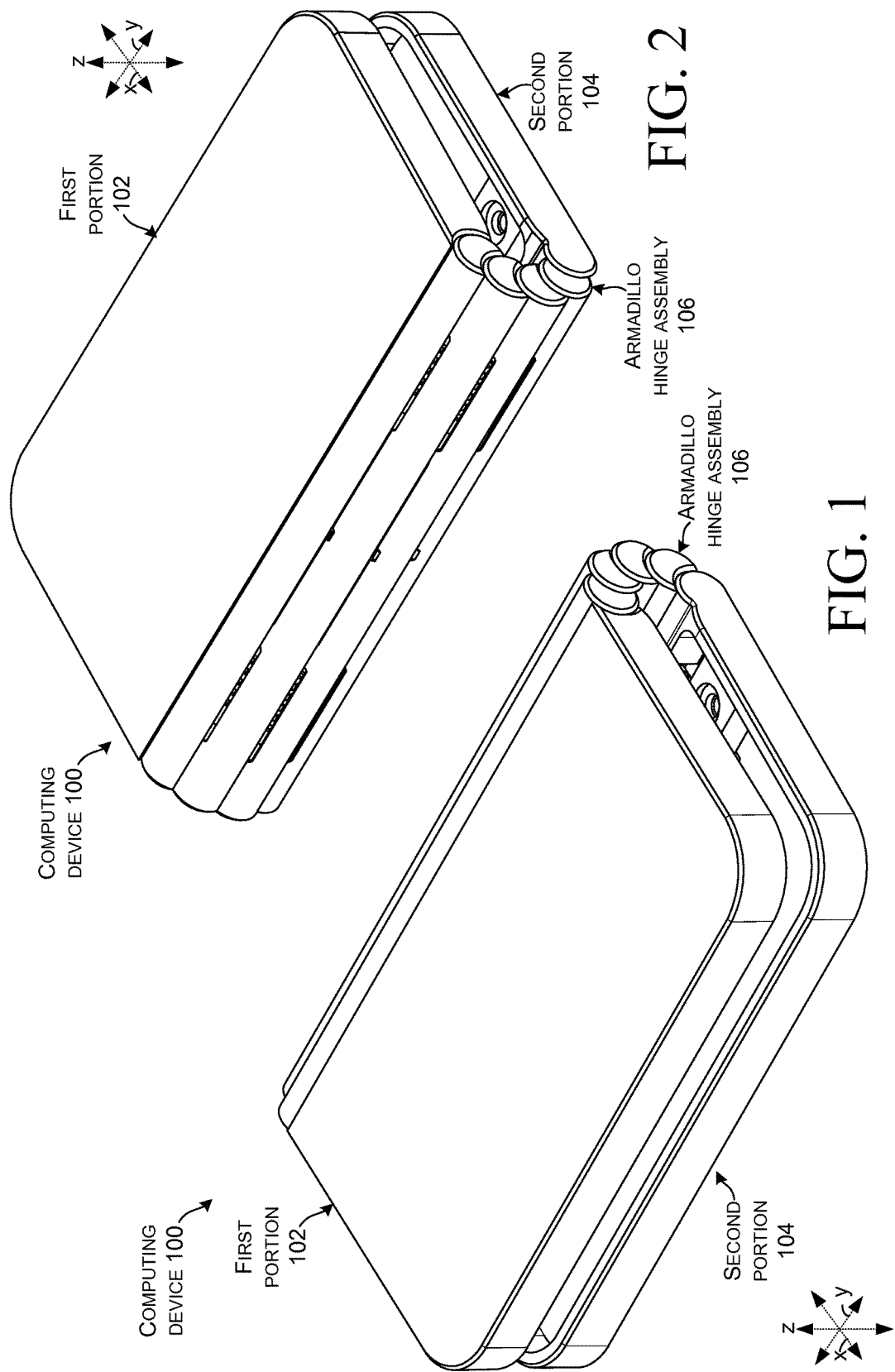

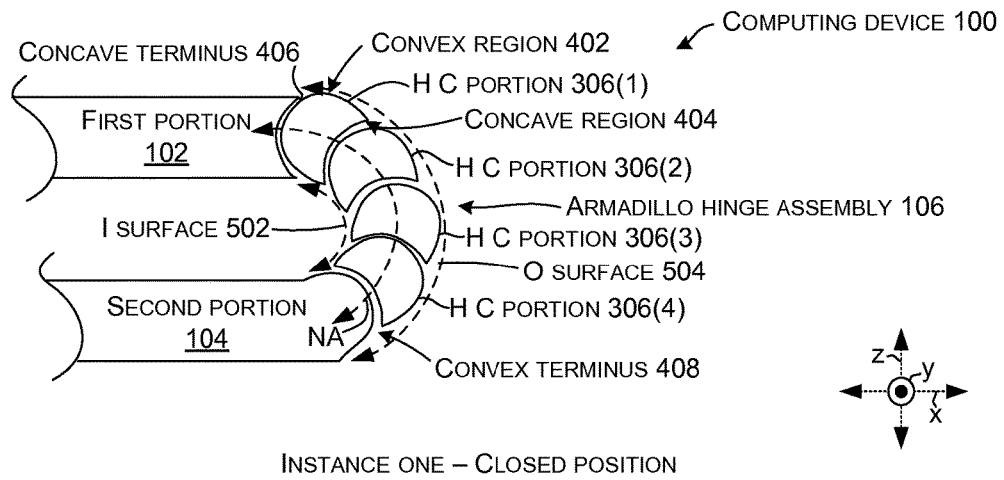
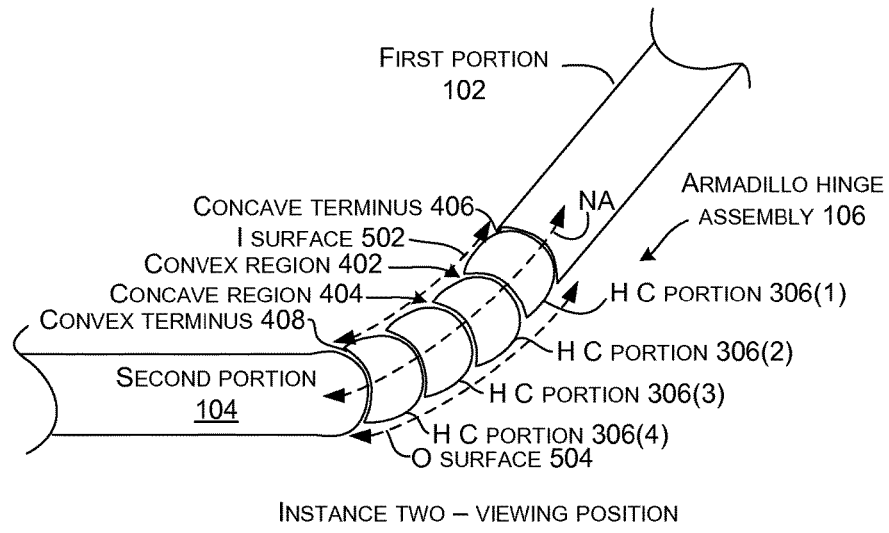
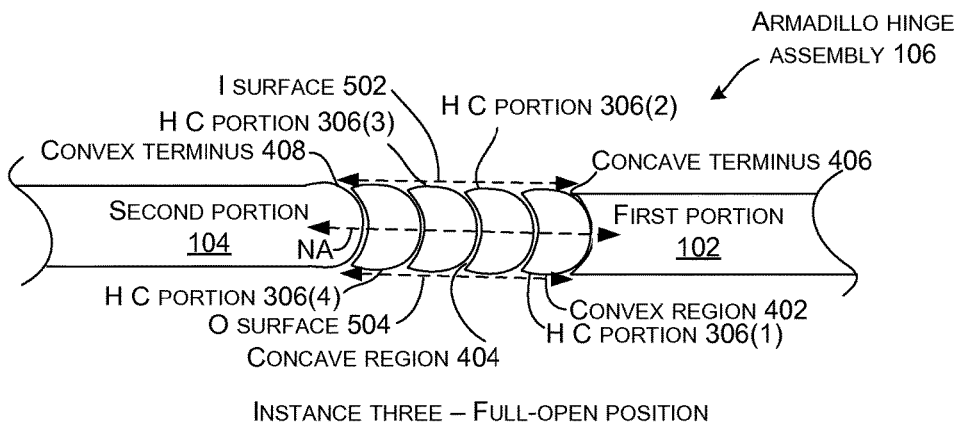
FIG. 5

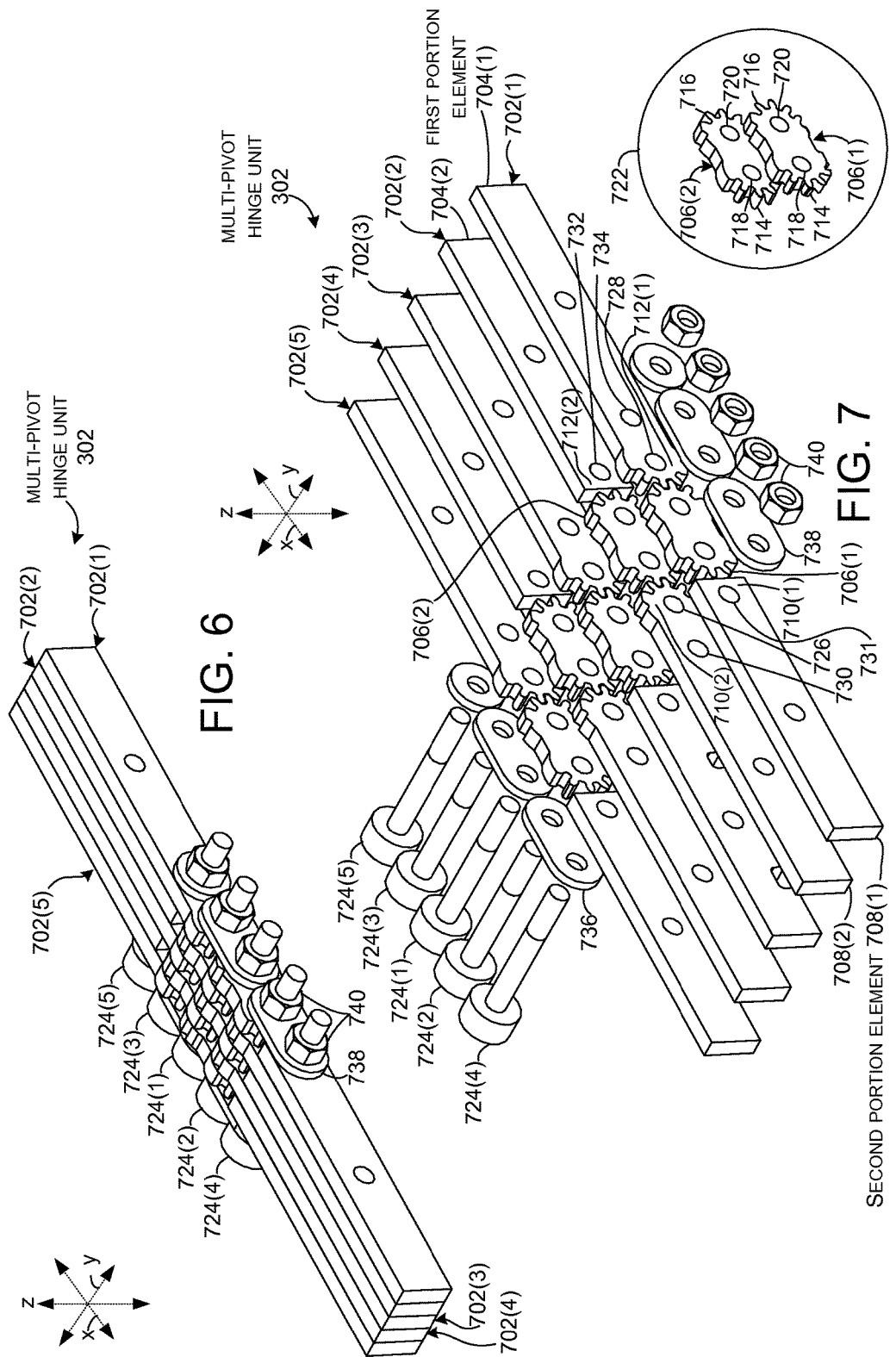

COVERED RADIUS HINGE

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

FIGS. 1-2 show perspective views of an example device that includes an armadillo hinge example in accordance with some implementations of the present concepts.

FIG. 5 is an elevational view of an armadillo hinge example in accordance with some implementations of the present concepts.

FIG. 6 is a perspective view and FIG. 7 is an exploded perspective view of a multi-pivot hinge example in accordance with some implementations of the present concepts.

DESCRIPTION

The present concepts relate to computing devices employing multi-axis or multi-pivot hinges to rotatably secure portions of the computing device. The present concepts can provide articulating hinge cover portions over the multi-pivot hinges to protect the hinges from foreign objects and/or protect a user of the computing device from being pinched by the multi-pivot hinges during rotation.

Introductory FIGS. 1 and 2 collectively show an example of a computing device 100 in a 'closed' position. FIG. 1 shows the computing device 100 from the 'front' and FIG. 2 shows the computing device from the 'back.' In this example, computing device 100 has first and second portions 102 and 104 that are rotatably secured together by an armadillo hinge assembly 106. Aspects of the armadillo hinge assembly are described in more detail below. The armadillo hinge assembly can include rigid articulating hinge covers that at least partially obscure and protect the underlying hinge.

Figure 3:
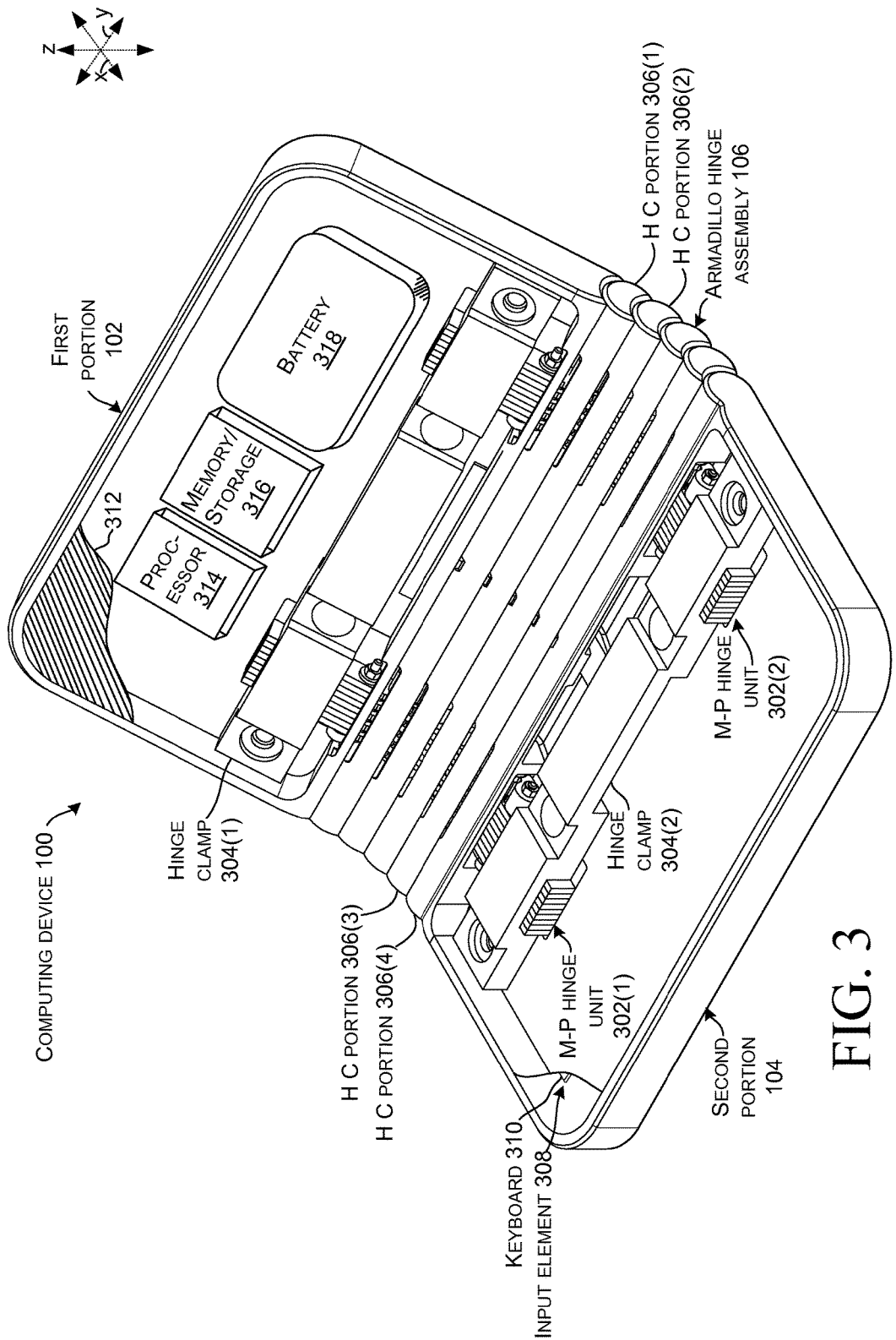
FIG. 3 shows a partial cut-away perspective view of an example device that includes an armadillo hinge example in accordance with some implementations of the present concepts.
Figure 4:
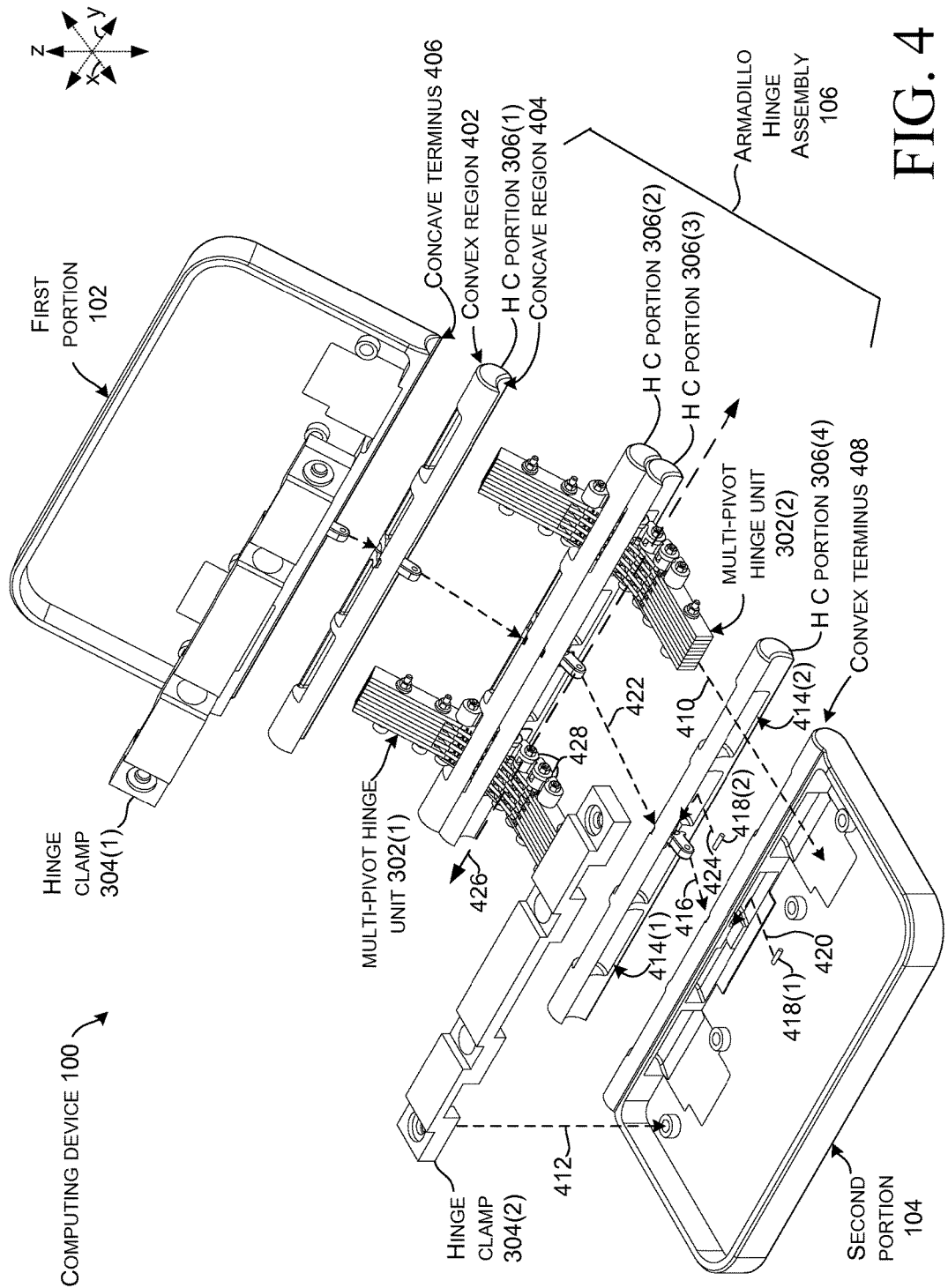
FIG. 4 shows an exploded perspective view of an example device that includes an armadillo hinge example in accordance with some implementations of the present concepts.

FIGS. 3 and 4 collectively show computing device 100 in an 'open' position. FIG. 3 is a partial cut-away perspective view and FIG. 4 is an exploded perspective view. In this case, the armadillo hinge assembly 106 includes a multi-pivot hinge unit 302 (in this configuration two multi-pivot hinge units 302(1) and 302(2)). In this example, the multi-pivot hinge units 302 can be secured to the first portion 102 by a first hinge clamp 304(1) and to the second portion 104 by second hinge clamp 304(2). The hinge clamps 304 can be secured to the respective first portion 102 and second portion 104 by various mechanisms, such as threaded fasteners (not shown). The armadillo hinge assembly 106 can also include multiple hinge cover portions 306 (in this configuration four hinge cover portions 306(1)-306(4)). In this implementation, individual hinge cover portions can be generally elongate (e.g., extending along a long axis that is parallel to the y reference axis).

Armadillo hinge assembly 106 can be secured to the first and second portions 102 and 104 to allow rotation therebetween. The armadillo hinge assembly 106 can be secured to the first and second portions in a relatively permanent manner (e.g., in a manner that is not intended to be readily separable by an end use consumer), such as illustrated in FIGS. 3-4. Alternatively, the armadillo hinge assembly 106 can be secured to the first and second portions in a relatively quickly attachable/detachable manner (e.g., in a manner that is intended to be readily separable by the end use consumer). One such example of this latter configuration is described below in more detail relative to FIG. 14.

Computing device 100 can also include an input element or device 308. In this case the input device 308 is manifest as a keyboard 310. Other implementations can employ other input devices. In this example, the computing device can also include a display screen 312, such as a touch sensitive display screen. The computing device can also include a processor 314, memory/storage 316, and/or a battery 318, among other components. These elements can be positioned in the first portion 102 and/or second portion 104. (These elements (308-318) are shown only in FIG. 3 and not FIG. 4).

In this particular implementation, the individual hinge cover portions 306 can approximate a portion of a cylinder (e.g., extending parallel to the y reference axis). Other example hinge cover shapes are described below relative to FIG. 13. As designated relative to FIG. 4, the individual hinge cover portions 306 can define a generally convex region 402 and a generally concave region 404 (designated with specificity relative to hinge cover portion 306(1). In a similar fashion the first portion 102 can culminate in a concave terminus 406 and the second portion 104 can terminate in a convex terminus 408 (or vice versa depending on orientation). An example assembly process is described at this point to provide additional clarity about the structures of the described implementation.

During assembly, the multi-pivot hinge units 302 can be inserted into the second portion 104 as indicated by arrow 410. The multi-pivot hinge units 302 can be secured with hinge clamp 304(2) as indicated by arrow 412. The hinge cover portions 306 can define ports or slots 414 (in this configuration two slots 414(1) and 414(2)) for receiving the multi-pivot hinge units 302. Stated another way, the dimensions of the slots 414 are as large as, or larger than, the outside dimensions of the multi-pivot hinge units 302 to allow the multi-pivot hinge units to pass through the slots in the hinge cover portions 306 and into the second portion 104 as indicated by arrow 410.

Hinge cover portion 306(4) can be positioned against the convex terminus 408 of the second portion 104 as indicated by arrow 416. The hinge cover portion 306(4) can be secured by a pin 418(1) as indicated by arrow 420. The pin 418(1) can retain the hinge cover portion 306(4) relative to the second portion 104 while allowing the hinge cover portion 306(4) to rotate around the pin.

Hinge cover portion 306(3) can be aligned with hinge cover portion 306(4) as indicated by arrow 422. Pin 418(2) can retain the hinge cover portion 306(3) as indicated by arrow 424. This process can be repeated until concave terminus 406 of the first portion is secured to hinge cover portion 306(1).

Note that as indicated by reference line 426, the above described implementation can provide a configuration where the axis of rotation of an individual hinge cover portion 306 is parallel to an axis of rotation (e.g., pivot or pivot axis) of the multi-pivot hinge unit 302. In the illustrated configuration the axis of rotation is parallel to, and coextensive with, an individual axis of rotation of the multi-pivot hinge unit. Note further that in this implementation, the number of hinge axes and the number of hinge cover portions generally corresponds in a one-to-one manner. However, such need not be the case. For instance, another implementation might have twice as many hinge cover portions as axes of rotation.

Also note that in this implementation, the multi-pivot hinge units 302 include rotation limiters 428 that can define or limit the degree of rotation of each axis of rotation of the multi-pivot hinge unit. For example, this particular implementation can limit the rotation of each axis of rotation to about 36 degrees for each of the five axes of rotation to provide total rotation of the first and second portions from zero degrees to one hundred eighty degrees. Other implementations may omit the rotation limiters and/or limit the rotation to different angles. Further, in some implementations the hinge cover portions 306 may contribute to and/or provide the rotation limitation for the armadillo hinge assembly 106.

FIG. 5 shows side views of a portion of computing device 100 to illustrate how the hinge cover portions 306 can be articulated to slide past one another during rotation of the armadillo hinge assembly 106. Instance one can be thought of as a closed or storage position of the computing device. Instance two can be thought of as a viewing or deployed position. Instance three can be thought of as a full-open position (e.g., in this case 180 degrees from the closed position). During this rotation, the convex region 402 of an individual hinge cover portion 306 can rotate relative to (e.g., slide past) a concave region 404 of an adjacent hinge cover portion 306. The end hinge cover portions can have a similar relationship with the concave terminus 406 of the first portion 102 and the convex terminus 408 of the second portion 104.

Note further, that this configuration can allow the hinge cover portions 306 to rotate relative to one another to accommodate differences on inner surface 502 and outer surface 504 of the armadillo hinge assembly 106. At Instance Three, the inner surface 502 and the outer surface 504 are generally equal lengths. As the first portion 102 is rotated toward the second portion 104 in Instance Two, the length of the inner surface 502 decreases (e.g., gets shorter) while the length of the outer surface 504 increases (e.g. gets longer). This process gets even more pronounced in Instance One. Thus, since the neutral axis (NA) remains between the inner and outer surface during rotation, the overlapping, articulating nature of the hinge cover portions allows these changing surface dimensions to be accommodated. Stated another way, the overlapping articulated nature of the hinge cover portions allows these changes in surface length to be accommodated while still covering the underlying hinge elements. In this example the changes in surface length can be accommodated by the overlapping concave and convex surfaces sliding past one another.

FIGS. 6 and 7 collectively show more details about one implementation of the multi-pivot hinge unit 302 introduced above relative to FIG. 3. Note that the use of other multi-pivot hinges is contemplated.

In the illustrated implementation, multi-pivot hinge unit 302 may include at least first and second adjacent offset stacks 702. The illustrated configuration includes five stacks 702(1)-702(5), however, more or less stacks may be employed. The number of stacks can be increased to add additional resistance to the multi-pivot hinge unit 302 as may be desired for a particular application. As may be most readily appreciated in the exploded view of FIG. 7, individual stacks may include a first portion element 704 (for securing to first portion 102 (see FIG. 3)), a timed link element 706, and a second portion element 708 (for securing to second portion 104 (see FIG. 3)). To improve readability of the drawing page only elements of the first two stacks 702(1) and 702(2) are designated. However, the stacks generally repeat themselves in an alternating manner. Thus, stack 702(3) and 702(5) are similar to stack 702(1) and stack 702(4) is similar to stack 702(2). Also, not every element is designated on each of FIGS. 6-7. In this implementation each stack includes a single timed link element 706. Other implementations may employ stacks that include multiple serially arranged timed link elements.

In the illustrated configuration of FIGS. 6-7, relative to stacks 702(1), 702(3), and 702(5) a terminal end 710 of the second portion element 708 is not geared to engage the timed link elements 706. In contrast, relative to stacks 702(2) and 702(4) the terminal ends 710 are geared to engage the timed link elements 706. Relative to stacks 702(1), 702(3), and 702(5) a terminal end 712 of the first portion element 704 is geared to engage the timed link elements 706. In contrast, relative to stacks 702(2) and 702(4) the terminal ends 712 are not geared to engage the timed link elements 706.

The timed link elements 706 can have generally opposing first and second ends 714 and 716 and a first hole 718 formed through the first end 714 and a second hole 720 formed through the second end 716. These elements are labeled without specificity in a callout 722 relative to FIG. 7 to avoid designator lines obscuring the main drawings. Note that in the illustrated configuration, individual timed link elements are geared on both ends. This configuration can allow multi-pivot hinge units 302 to be constructed with fewer different types of elements. However, note that the first end 714 of timed link element 706(1) does not engage terminal end 710(1) of second portion element 708(1) and thus the gear teeth are not utilized and thus could be eliminated. Similarly, the second end 716 of timed link element 706(2) could also eliminate the gear teeth because they do not engage terminal end 712(2) of first portion element 704(2).

Multi-pivot hinge unit 302 may include a generally elongate axis pin 724(1) that passes through the second hole 720 of the timed link element 706(1) of the first stack 702(1). The axis pin 724(1) can also pass through the first hole 718 of the timed link element 706(2) of the second stack 702(2) to secure the second stack 702(2) in an offset manner relative to the first stack 702(1). In this case, the offset manner can be defined by a pitch diameter of the timed link elements.

The multi-pivot hinge unit 302 may include a second axis pin 724(2) and a third axis pin 724(3) that are generally parallel to the first axis pin 724(1). The second axis pin 724(2) can pass through a hole 726 in the second portion element 708(2) of the second stack 702(2) and the hole 718 in the first end of the timed link element 706(1) of the first stack 702(1). The third axis pin 724(3) can pass through the hole 720 in the second end 716 of the timed link element 706(2) of the second stack 702(2) and a hole 728 in the first portion element 704(1) of the first stack 702(1).

In the present configuration, the second axis pin 724(2) and the third axis pin 724(3) are on opposite sides of the (first) axis pin 724(1). This configuration may include a fourth axis pin 724(4) that is adjacent to the second axis pin 724(2) and distal to the axis pin 724(1) and a fifth axis pin 724(5) that is adjacent to the third access pin 724(3) and distal to the axis pin 724(1). The fourth axis pin 724(4) can pass through a second hole 730 in the second portion element 708(2) of the second stack 702(2) and a hole 731 in the second portion element 708(1) of the first stack 702(1). The fifth axis pin 724(5) can pass through a hole 732 in the second portion element 704(2) of the second stack 702(2) and a second hole 734 of the first portion element 704(1) of the first stack 702(1).

In this implementation, the axis pins 724 can be manifest as threaded bolts. The bolts can pass through link covers 736 (not all of which are designated with specificity) through the stacks 702(1)-702(5) and through another set of link covers 738 and a set of threaded nuts 740. In the implementation illustrated in FIGS. 3-4 the rotation limiters can be added to the axis pins between the link covers 738 and the threaded nuts 740.

In the present configuration the second axis pin 724(2) and the fourth axis pin 724(4) share common link covers on each side of the first and fifth stacks and the axis pin 724(1) and the third axis pin 724(3) share other common link covers on each side of the first and fifth stacks. The threaded bolts, link covers 738, and the nuts 740 may provide a compressive force to squeeze the stacks against one another to create friction between the adjacent elements. In some implementations, an axial load may be applied between elements through the use of a spring washer between the nuts 740 and the link covers 738 to create and maintain the desired friction interface between the stacks. The spring washer can help to maintain the axial load even as elements wear. At some point if the spring washer cannot maintain the load, these implementations can be readily adjusted by tightening the bolt/nuts to increase the friction.

The illustrated configuration may be viewed as employing axial friction to control hinge stiffness. Other types of axial friction configurations can be employed. An alternative configuration can utilize oversize axis pins 724 (relative to the holes). The oversize axis pins can be force fit through the holes in the stacks 702 to create a friction fit between the axis pin and the elements defining the holes. This configuration may be viewed as employing radial friction to control hinge stiffness and other configurations are contemplated.

In this implementation relative to the first stack 702(1), the first end 714 of the timed link element 706(1) does not engage the second portion element 708(1). The second end 716 can engage the first portion element 704(1) in a no-slip one-to-one rotational engagement. Relative to the second stack 702(2), the first end 714 of the timed link element 706(2) can engage the second portion element 708(2) in a no-slip one-to-one rotational engagement and the second end 716 does not engage the first portion element 704(2). In this case, the no-slip one-to-one rotational engagement is accomplished by intermeshing gears that cause the multi-pivot hinge unit 302 to rotate around axis pins 724(1), 724(2), and 724(3) simultaneously. Other implementations can utilize other gear profiles and/or types of gears and/or can utilize non-geared solutions such as smooth but high friction radial surfaces. Characterized from one perspective, the multi-pivot hinge implementation illustrated in FIGS. 6-7 can simultaneously pivot around three axes (e.g., axis pins 724(1), 724(2), and 724(3)). Other numbers of axis pins are contemplated for other implementations. Further, the multi-pivot hinge unit 302 can be thought of as a radius hinge unit in that the hinge unit can maintain a radius of curvature even in the closed position (the radius can expand as the hinge unit is opened). Further still, this implementation of the multi-pivot hinge unit can be thought as a controlled radial hinge in that the gears control the movement around the pivot axes. Other controlled and uncontrolled multi-pivot hinge implementations can be employed with the armadillo hinge cover concepts.

Figure 8:
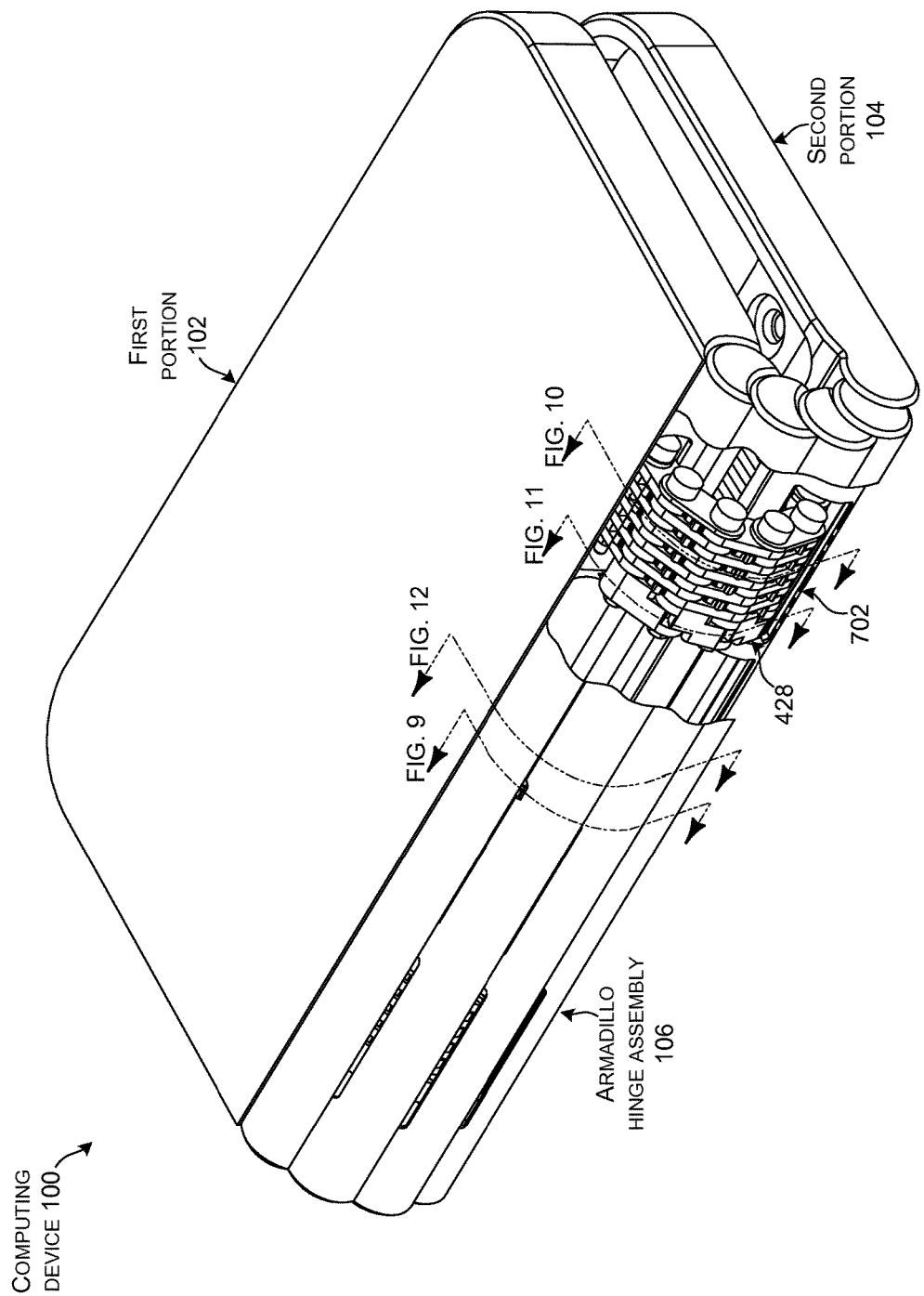
FIG. 8 shows a partial cut-away perspective view that is similar to FIG. 2 of an example device that includes an armadillo hinge example in accordance with some implementations of the present concepts.

FIG. 8-12 collectively show additional details about computing device 100 and its armadillo hinge assemblies 106. FIG. 8 shows a view of computing device 100 that is similar to FIG. 2, except that a portion of the computing device is shown cutaway to expose underlying elements, such as rotation limiters 428 and stacks 702. FIGS. 9-12 show cross sections of computing device 100 as indicated in FIG. 8.

Figure 9:
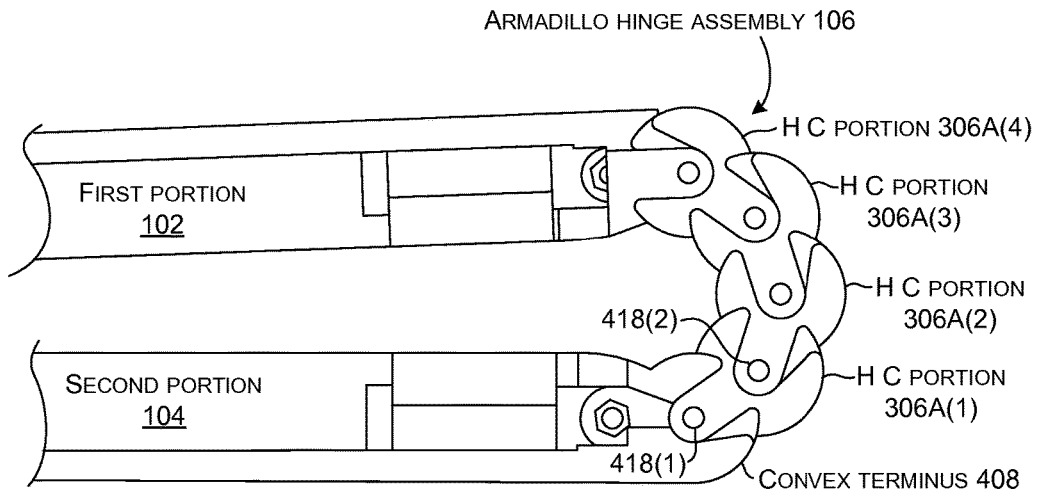
FIGS. 9-12 are sectional views of armadillo hinge examples as indicated in FIG. 8 in accordance with some implementations of the present concepts.

FIG. 9 shows hinge cover portions 306A rotatably secured to one another by pins 418. Pin 418(1) is specifically designated securing the second portion's convex terminus 408 to hinge cover portion 306A(1). Pin 418(2) is specifically designated securing the hinge cover portion 306A(1) to hinge cover portion 306A(2).

Figure 10:
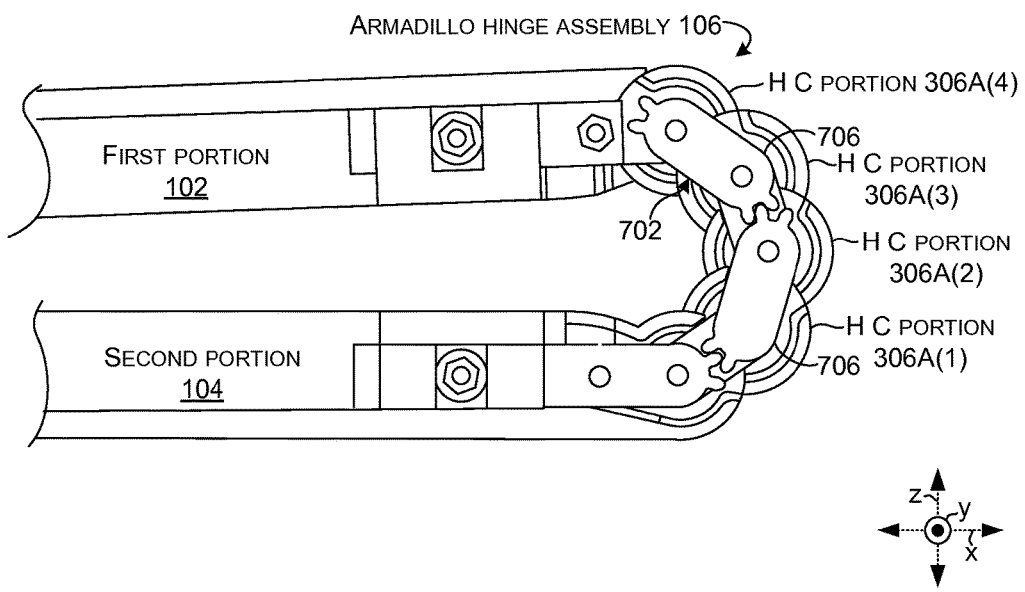

FIG. 10 shows how hinge cover portions 306A can float over the underlying hinge elements, such as stack 702. In this example the underlying hinge elements are the stack's timed link elements 706 described above relative to FIGS. 6-7).

Figure 11:
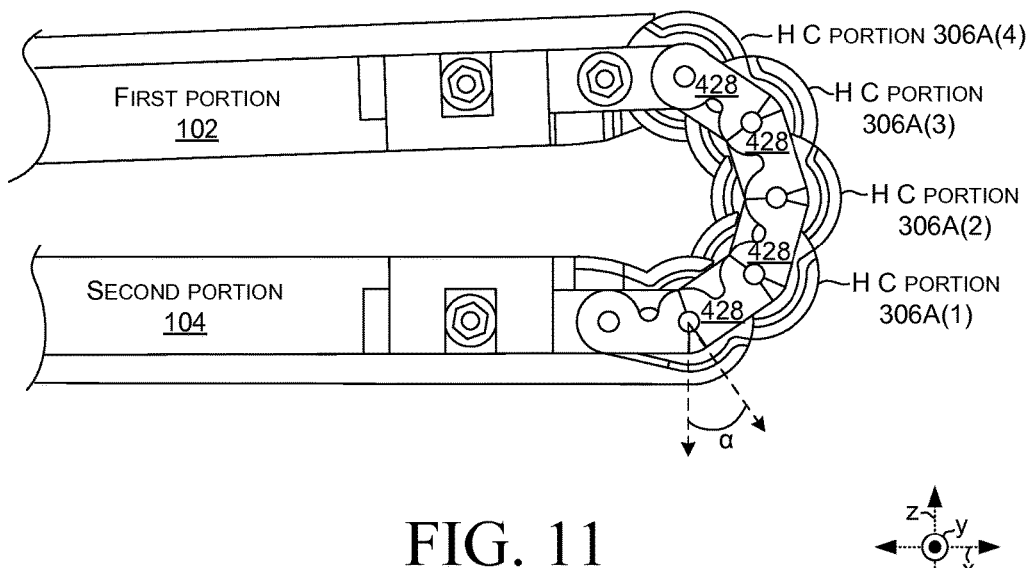

FIG. 11 shows rotation limiters 428 of the armadillo hinge assembly 106. (In FIG. 11, the rotation limiters are indicated generally rather than specifically due to space constraints on the drawing page). An individual rotation limiter (or a pair of rotation limiters) can limit rotation of the corresponding hinge axis to a define angle of rotation a.

Figure 12:
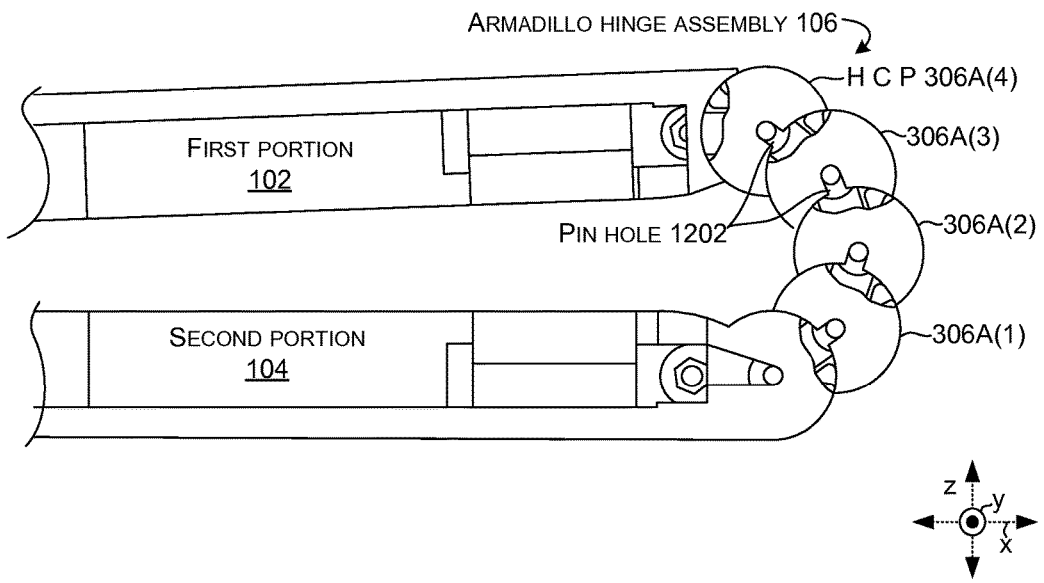

FIG. 12 shows how pin holes 1202 can be manufactured in the hinge cover portions 306A. In this implementation, the hinge cover portions are held together in tension. As such, assembly can be accomplished with a pin hole in only one side of the hinge cover portion. This configuration can eliminate any need for a complicated slide for an injection molded part or an impractical feature for a machined part.

Figure 13:
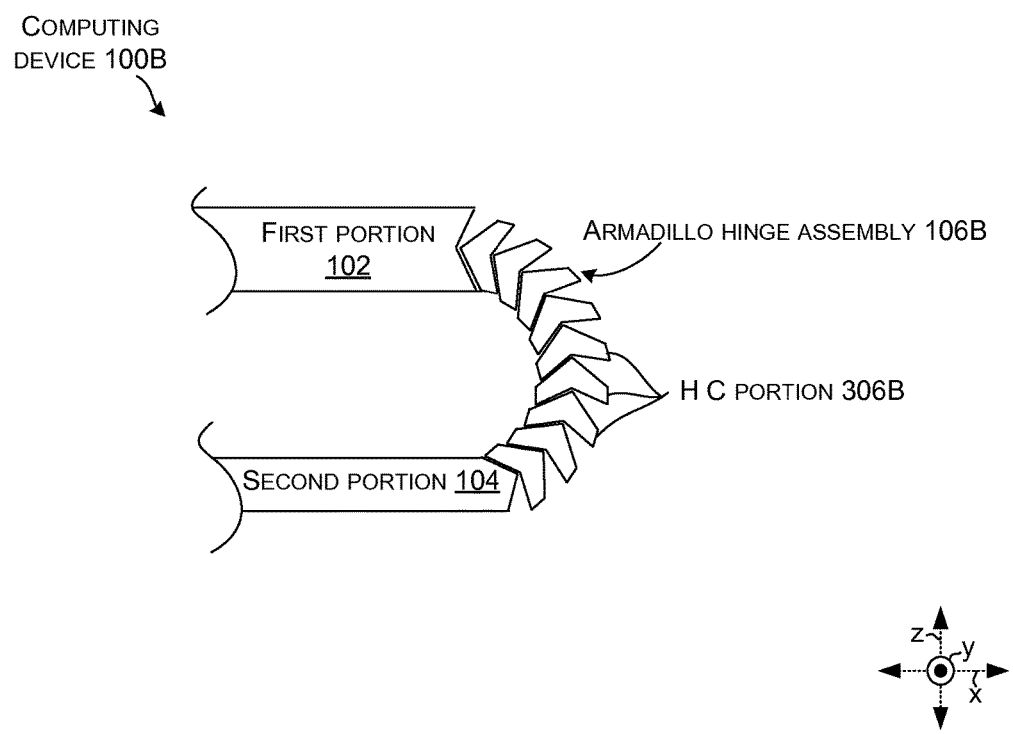
FIG. 13 is an elevational view of an armadillo hinge example in accordance with some implementations of the present concepts.

FIG. 13 shows an alternative configuration relating to computing device 100B where hinge cover portions 306B of armadillo hinge assembly 106B have generally linear profiles rather than the curvilinear profiles as shown relative to FIGS. 1-12. Further, as mentioned above, the number of hinge cover portions does not need to correspond to the number of underlying hinge axes. For instance, the illustrated configuration has nine hinge cover portions and could have three of more underlying hinge axes.

Figure 14:
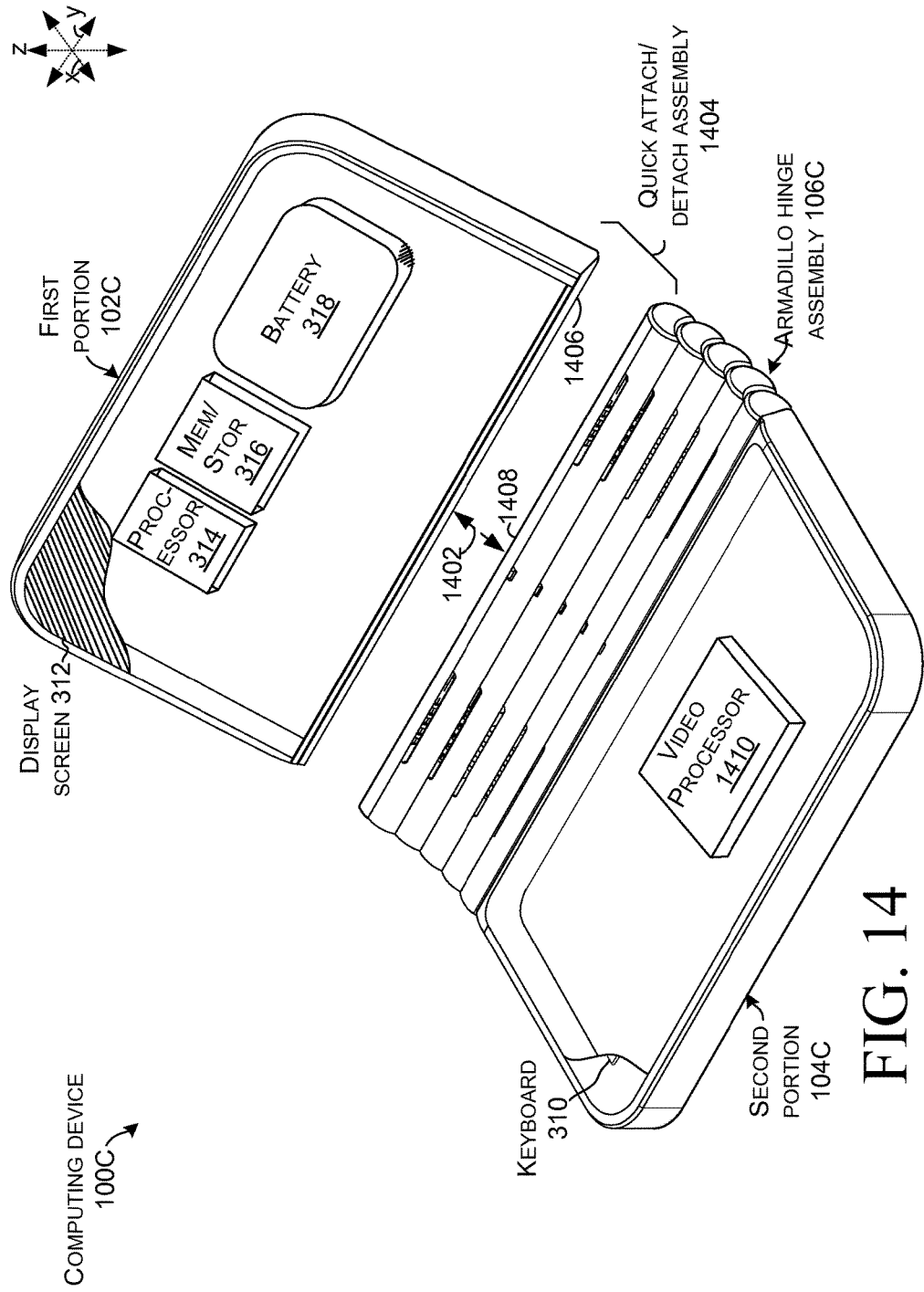
FIG. 14 shows a partial cut-away perspective view of another example device that includes an armadillo hinge example in accordance with some implementations of the present concepts.

FIG. 14 shows a view that is similar to the view of FIG. 3. In this case, computing device 100C includes first and second portions 102C and 104C that are rotatably secured by armadillo hinge assembly 106C. In this example, the armadillo hinge assembly 106C is configured to allow an end user consumer to easily detach either or both of the first and second portions 102C and 104C from the armadillo hinge assembly 106C as indicated by arrow 1402. In this example the armadillo hinge assembly 106C can include a quick attach/detach assembly 1404. The quick attach/detach assembly 1404 may include cooperatively operating elements 1406 and 1408 located on the first portion 102C and the armadillo hinge assembly 106C, respectively.

In one example, element 1406 can be manifest as a latch and element 1408 can be manifest as a receiver. The latch can engage the receiver to removeably couple the first portion 102C with the armadillo hinge assembly 106C. In another example, the elements 1406 and 1408 may magnetically couple to one another in a manner that can be overcome by the user to separate the first portion from the armadillo hinge assembly. Other quick attach/detach assemblies 1404 are contemplated. Note further that alternatively or additionally to mechanically coupling the armadillo hinge assembly 106C to the first and/or second portions, the quick attach/detach assembly 1404 can detachably electrically couple electronic components of the first and second portions. For instance, the quick attach/detach assembly 1404 may electrically couple processor 314, storage/memory 316, and/or battery 318 from the first portion 102C to a video processor 1410 in the second portion 104C.

Thus, the quick attach/detach assembly 1404 can allow the user to be able to detach first portion 102C or second portion 104C to use either portion independent of the other. For example, first portion 102C may be operated as a stand-alone tablet device, and then may be attached to second portion 104C via armadillo hinge assembly 106C to form a device more akin to a laptop device. A user may also be able to exchange first portion 102C or second portion 104C for application-specific devices. For example, an individual second portion may include a keyboard and/or a touchscreen. In certain scenarios, the user may attach a first touchscreen as the first portion and a second touchscreen as second portion, and utilize the device like a book. In other scenarios, a user may attach a touchscreen as the first portion and an input device, comprising a keyboard and trackpad, as the second portion, and utilize the device like a laptop. Other configurations and implementations are contemplated.

Individual elements of the multi-pivot hinge unit and/or the hinge cover portions can be made from various materials, such as sheet metals, die cast metals, and/or molded plastics, among others, or any combination of these materials.

Armadillo hinge assemblies can be utilized with any type of computing device, such as but not limited to notebook computers, smart phones, wearable smart devices, and/or other types of existing, developing, and/or yet to be developed computing devices.

Example Methods

Various methods of manufacture, assembly, and use for armadillo hinge assemblies are contemplated beyond those shown above relative to FIGS. 1-14.

Additional Examples

Various examples are described above. Additional examples are described below. One example is manifest as a device that has a first portion that includes a display screen and a second portion that includes an input device. The example can also include a multi-pivot hinge unit rotatably securing the first portion and the second portion and configured to rotate around multiple hinge axes to provide rotation between the first and second portions. The example can further include multiple hinge cover portions that collectively cover the multi-pivot hinge unit between the first portion and the second portion. An individual hinge cover portion can rotate around an axis of rotation that is parallel to a corresponding individual hinge axis.

Any combination of the above and/or below examples where the axis of rotation of the individual hinge cover portion is co-extensive to the corresponding individual hinge axis.

Any combination of the above and/or below examples where the multi-pivot hinge unit further comprises a rotation limiter to limit a degree of rotation of the first portion relative to the second portion.

Any combination of the above and/or below examples where the rotation limiter comprises multiple rotation limiters with individual rotation limiters associated with individual hinge axes.

Any combination of the above and/or below examples where the multiple rotation limiters are secured to the multi-pivot hinge unit.

Any combination of the above and/or below examples where the multiple hinge cover portions function as the multiple rotation limiters.

Any combination of the above and/or below examples where the multi-pivot hinge unit comprises first and second multi-pivot hinge units and wherein the multiple hinge cover portions include first and second parallel slots through which the respective first and second multi-pivot hinge units extend.

Any combination of the above and/or below examples where the multiple hinge cover portions are fastened to one another, but are not fastened to the multi-pivot hinge units.

Any combination of the above and/or below examples where the multiple hinge cover portions are pivotably fastened to one another.

Any combination of the above and/or below examples where the multiple hinge cover portions are fastened to either of the first portion or the second portion or wherein the multiple hinge cover portions are fastened to both of the first portion and the second portion.

Any combination of the above and/or below examples where the multiple hinge cover portions are articulated so that a first region of a first individual hinge cover portion can slide past a second region of a second adjacent individual hinge cover portion during rotation so that an underlying portion of the multi-pivot hinge unit is not exposed.

Any combination of the above and/or below examples where the first region comprises a convex region of the first individual hinge cover portion and the second region comprises a concave region of the second adjacent individual hinge cover portion.

Any combination of the above and/or below examples where the multi-pivot hinge unit comprises a radius hinge unit.

Any combination of the above and/or below examples where the individual hinge cover portion approximates a portion of a cylinder.

Another example is manifest as a first portion and a second portion. The example can include a multi-pivot hinge unit rotatably securing the first and second portions. The example can further include a set of rigid hinge cover portions that are configured to be able to rotate relative to one another while collectively covering the multi-pivot hinge unit.

Any combination of the above and/or below examples where a number of the rigid hinge cover portions in the set of rigid hinge cover portions equals a number of rotational axes in the multi-pivot hinge unit.

Any combination of the above and/or below examples where a number of the rigid hinge cover portions in the set of rigid hinge cover portions is greater than a number of rotational axes in the multi-pivot hinge unit.

Another example is manifest as a first portion and a second portion. The example can include an armadillo hinge assembly rotatably securing the first and second portions.

Any combination of the above and/or below examples where the armadillo hinge assembly comprises a multi-pivot hinge unit covered with overlapping, articulating, rigid hinge covers.

Any combination of the above and/or below examples where individual hinge covers extend along a long axis.

Any combination of the above and/or below examples where individual hinge covers approximate a portion of cylinder and include a concave region and a convex region and wherein the overlapping is achieved between the concave region of an individual hinge cover and the convex region of an adjacent individual hinge cover.

Any combination of the above and/or below examples where the armadillo hinge assembly is configured to be quickly attached and detached from either or both of the first and second portions.

CONCLUSION

Although techniques, methods, devices, systems, etc., pertaining to armadillo hinge assemblies are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computing device, comprising:
a first portion that includes a display screen and a second portion that includes an input device;
first and second multi-pivot hinge units rotatably securing the first portion and the second portion and configured to rotate around multiple hinge axes to provide rotation between the first and second portions; and,
multiple hinge cover portions that collectively cover the first and second multi-pivot hinge units between the first portion and the second portion, the multiple hinge cover portions being articulated so that a first region of an individual hinge cover portion can slide past a second region of an adjacent individual hinge cover portion during rotation so that an underlying portion of the first and second multi-pivot hinge unit is not exposed, the multiple hinge cover portions including first and second parallel slots, the first and second multi-pivot hinge units configured to pass through the first and second parallel slots.

2. The computing device of claim 1, wherein dimensions of the first and second parallel slots are at least as large as outside dimensions of the first and second multi-pivot hinge units to allow the first and second multi-pivot hinge units to pass through the first and second parallel slots.

3. The computing device of claim 1, wherein the first multi-pivot hinge unit further comprises a rotation limiter to limit a degree of rotation of the first portion relative to the second portion.

4. The computing device of claim 3, wherein the rotation limiter comprises multiple rotation limiters with individual rotation limiters associated with individual hinge axes.

5. The computing device of claim 4, wherein the multiple rotation limiters are secured to the first multi-pivot hinge unit.

6. The computing device of claim 4, wherein the multiple hinge cover portions function as the multiple rotation limiters.

7. The computing device of claim 1, wherein the multiple hinge cover portions are articulated relative to an inner surface and an outer surface of the computing device.

8. The computing device of claim 1, wherein a number of the multiple hinge cover portions is not the same as another number of the multiple hinge axes.

9. The computing device of claim 1, wherein the multiple hinge cover portions are pivotably fastened to one another.

10. The computing device of claim 1, wherein the multiple hinge cover portions are fastened to either of the first portion or the second portion or wherein the multiple hinge cover portions are fastened to both the first portion and the second portion.

11. The computing device of claim 1, wherein the first region of the individual hinge cover portion and the second region of the adjacent individual hinge cover portion are curved.

12. The computing device of claim 11, wherein the first region comprises a convex region of the individual hinge cover portion and the second region comprises a concave region of the adjacent individual hinge cover portion.

13. The computing device of claim 1, wherein the first multi-pivot hinge unit comprises a radius hinge unit.

14. The computing device of claim 1, wherein the individual hinge cover portion approximates a portion of a cylinder.

15. The computing device of claim 1, wherein a number of the multiple hinge cover portions equals a number of the multiple hinge axes.

16. The computing device of claim 1, wherein a number of the multiple hinge cover portions is greater than another number of the multiple hinge axes.

17. The computing device of claim 1, wherein the multiple hinge cover portions are articulated so that the multiple hinge cover portions overlap relative to an inner surface and an outer surface of the computing device.

18. The computing device of claim 17, wherein the multiple hinge cover portions are configured to cover the first and second multi-pivot hinge units while the inner surface and the outer surface change in surface length.

19. A computing device, comprising:
a first portion and a second portion;
first and second multi-pivot hinge units rotatably securing the first portion and the second portion and configured to rotate around multiple hinge axes to provide rotation between the first and second portions; and,
multiple hinge cover portions that collectively cover the first and second multi-pivot hinge units between the first portion and the second portion, the multiple hinge cover portions being articulated so that a first region of an individual hinge cover portion can slide past a second region of an adjacent individual hinge cover portion during rotation so that an underlying portion of the first and second multi-pivot hinge unit is not exposed, the multiple hinge cover portions including first and second parallel slots, the first and second multi-pivot hinge units configured to pass through the first and second parallel slots.

* * * * *